United States Patent

Nishikiori et al.

[11] Patent Number: 5,704,494
[45] Date of Patent: Jan. 6, 1998

[54] DISC HOLDER

[75] Inventors: Kazuhiko Nishikiori, Fujikawa; Hiroshi Hirano; Taiki Kawasumi, both of Matsumoto, all of Japan

[73] Assignee: Nihon Plast Co., Ltd., Fuji, Japan

[21] Appl. No.: 663,700

[22] Filed: Jun. 14, 1996

[30] Foreign Application Priority Data

Jun. 16, 1995 [JP] Japan ................................. 7-150757
Jun. 16, 1995 [JP] Japan ................................. 7-150772

[51] Int. Cl.⁶ .................................................. A47F 7/00
[52] U.S. Cl. .......................... 211/41.12; 211/41.18; 206/454; 118/500
[58] Field of Search .......................... 211/40, 41.12, 211/41.18, 194; 206/454, 449; 118/500

[56] References Cited

U.S. PATENT DOCUMENTS

| | | | |
|---|---|---|---|
| 4,653,636 | 3/1987 | Armstrong | 211/41.18 X |
| 4,669,612 | 6/1987 | Mortensen | 206/454 |
| 4,949,848 | 8/1990 | Kos | 211/41 |
| 5,193,682 | 3/1993 | Naito et al. | 211/41.18 X |
| 5,351,836 | 10/1994 | Mori et al. | 206/454 X |

FOREIGN PATENT DOCUMENTS

| | | |
|---|---|---|
| 59-056737 | 4/1984 | Japan . |
| 61-049450 | 4/1986 | Japan . |
| 62-33436 | 2/1987 | Japan . |
| 3-500713 | 2/1991 | Japan . |
| 4-131938 | 12/1992 | Japan . |

*Primary Examiner*—Robert W. Gibson, Jr.
*Attorney, Agent, or Firm*—Foley & Lardner

[57] ABSTRACT

A plastic disc holder for holding a plurality of discs separately, comprises axially opposed end walls; and laterally opposed side walls which are united with the end walls to constitute a rectangular parallelopiped box which is fully opened at upper and lower portions. Each side wall includes spaced side posts; an upper beam extending between upper portions of the side posts; an intermediate beam extending between intermediate portions of the side posts; a lower beam extending between lower portions of the side posts; first group of strut portions which extend between the upper and intermediate beams; and second group of strut portions which extend between the intermediate and lower beams. Each of the intermediate and lower beams is formed at an inner surface with a plurality of guide grooves for guiding the discs when the discs are put into the disc holder from the above.

16 Claims, 6 Drawing Sheets

DISC HOLDER

BACKGROUND OF THE INVENTION

1. Field of the Invention

The present invention relates in general to holders for holding discs, and more particularly to disc holders for holding untreated memory discs, such as discs of silicone wafer, discs of hard disc substrate or the like. More specifically, the present invention is concerned with a plastic disc holder which holds therein a plurality of untreated memory discs separately and vertically and lets the discs take a chemical and/or annealing treatment while keeping them therein.

2. Description of the Prior Art

In order to safely hold untreated thin discs, such as those mentioned hereinabove, various types of disc holders have been hitherto proposed and put into practical use particularly in the field of electronic parts manufacturing industries. Some of them are shown in Japanese Patent First Provisional Publication 62-33436, Japanese Patent Second Provisional Publication 3-500713, and Japanese Utility Model First Provisional Publications 59-56737, 61-49450 and 4-131938.

However, due to inherent construction, the disc holders of these publications have failed to satisfy the users. In fact, among the conventional disc holders, there are some holders which tend to damage the discs during conveyance. Furthermore, some of them are bulky in construction.

SUMMARY OF THE INVENTION

It is therefore an object of the present invention to provide a compact disc holder which can safely hold the discs.

It is another object of the present invention to provide a disc holder which can let the discs take a chemical and/or annealing treatment with the discs held therein.

It is a still another object of the present invention to provide a disc holder which is easily produced.

According to the present invention, there is provided a disc holder for holding a plurality of discs separately. The disc holder comprises axially opposed end walls; and laterally opposed side walls which are united with the end walls to constitute a rectangular parallelopiped box which is fully opened at upper and lower portions. Each side wall includes spaced side posts; an upper beam extending between upper portions of the side posts; an intermediate beam extending between intermediate portions of the side posts; a lower beam extending between lower portions of the side posts; first group of strut portions which extend between the upper and intermediate beams; and second group of strut portions which extend between the intermediate and lower beams. Each of the intermediate and lower beams is formed at an inner surface with a plurality of guide grooves for guiding the discs when the discs are put into the disc holder from the above.

BRIEF DESCRIPTION OF THE INVENTION

Other objects and advantages of the present invention will become apparent from the following description when taken in conjunction with the accompanying drawings, in which.

DETAILED DESCRIPTION THE INVENTION

Figure 1:
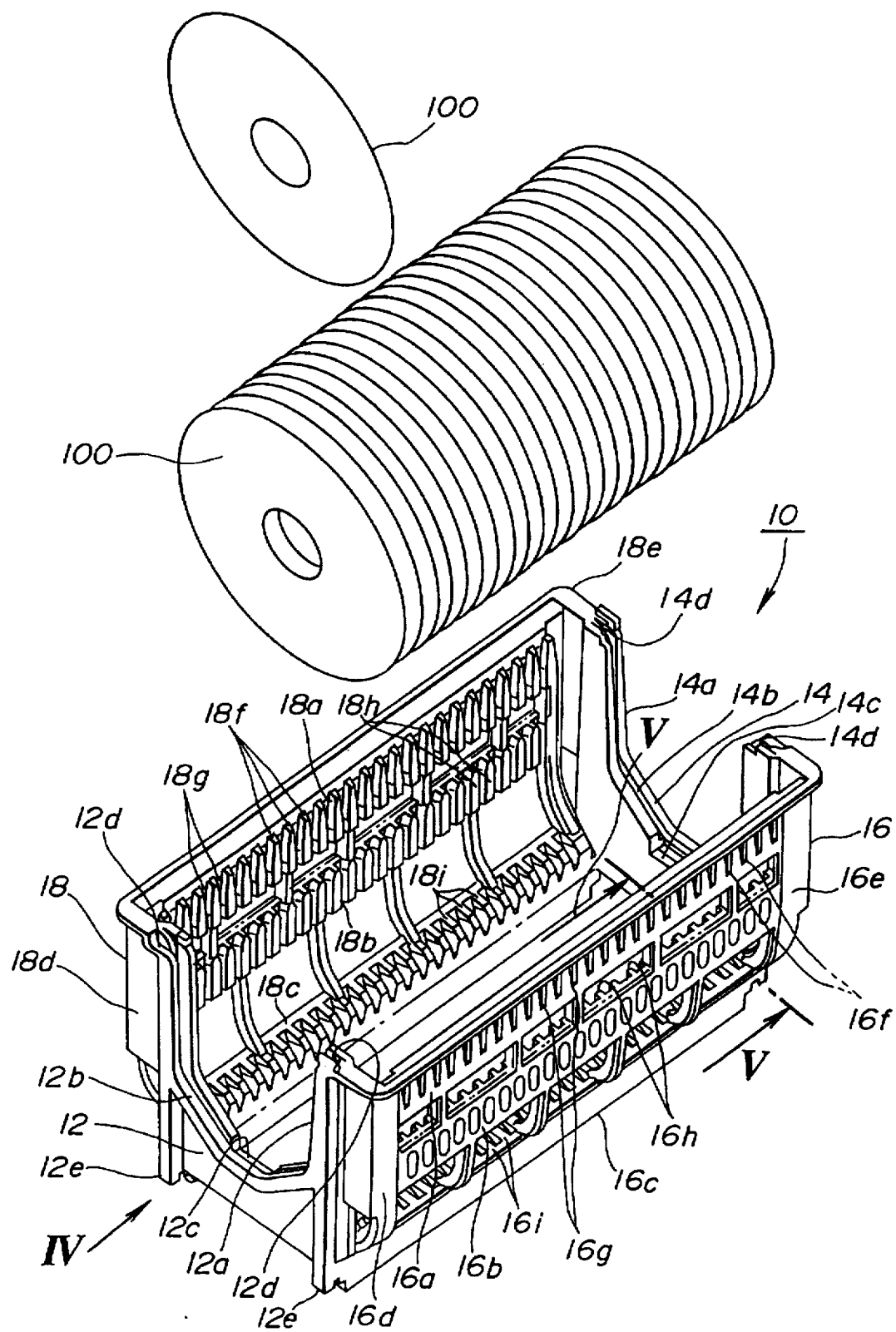
FIG. 1 is a perspective view of a disc holder of the present invention and discs which are to be held by the disc holder.

Referring to the drawings, particularly FIG. 1, there are shown a disc holder 10 of the present invention and discs 100 which are to be held by the holder 10. The discs 100 may be of an aluminum substrate for memory discs used in computers. Each disc 100 has a center opening as shown.

The disc holder 10 is constructed of a molded plastic. Injection technique is used for molding the disc holder 10. The material of the disc holder 10 may be polyamide resin, thermotropic liquid crystal polymer (TLCP), polyether.ether.ketone (PEEK), polyether.keton (PEK), alloy resin of PEEK system (such as PEEK/thermotropic liquid crystal polymer, PEEK/polybenzo-imidazole and the like), polybenzo.imidazole (PBI), polyphenylene.sulfide (PPS), polyether.sulphon (PES), polyether.imide (PEI), polytetrafluoroethylene (PTFE) or the like. Preferably, the disc holder 10 is constructed of PEEK/thermotropic liquid crystal polymer.

The disc holder 10 generally comprises axially opposed end walls 12 and 14, and laterally opposed side walls 16 and 18 which are united to constitute a rectangular parallelopiped box. As shown, the disc holder 10 is fully opened at upper and lower portions thereof.

Each end wall 12 or 14 is formed at an upper portion with a larger U-shaped recess 12a or 14a. The end wall 12 or 14 is formed, along a periphery which bounds the recess 12a or 14a, with a guide groove 12b or 14b. As will become apparent hereinafter, the guide groove 12b or 14b is used for assuredly putting a lid member 20 (see FIG. 2) on the disc holder 10. Each guide groove 12b or 14b is formed with a drain hole 12c or 14c at the lowermost position.

Figure 3:
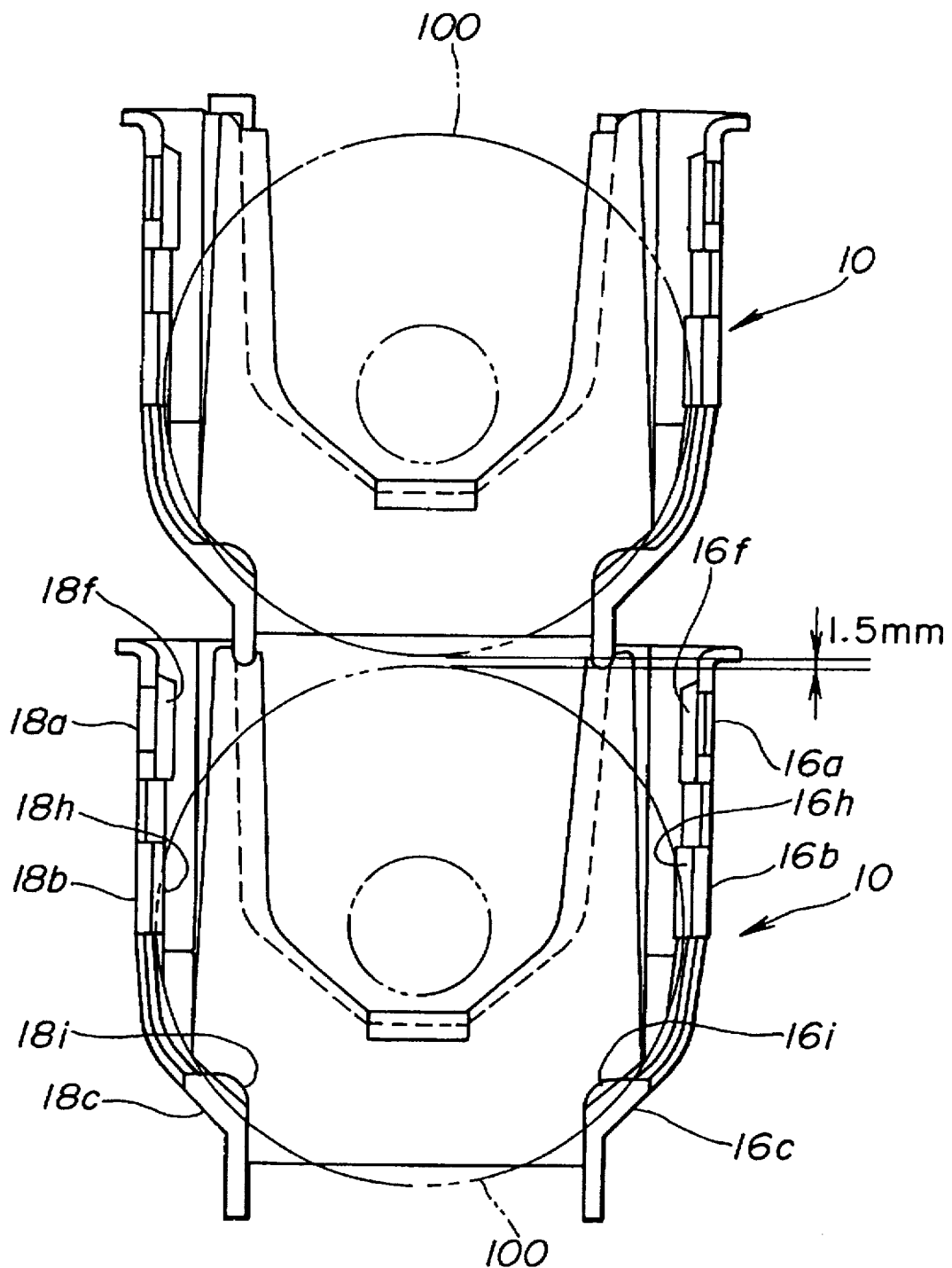
FIG. 3 is an illustration showing two disc holders of the invention under a condition wherein one is put on another.

Each end wall 12 or 14 is formed at spaced top portions with respective recesses 12d or 14d which are merged with the groove 12b or 14b. Furthermore, each end wall 12 or 14 is formed at spaced bottom portions with respective projections 12e or 14e (not shown). As will become apparent as the description proceeds, when, as is shown in FIG. 3, the disc holder 10 is properly put on another disc holder 10 which has the same construction as the upper disc holder 10, the projections 12e and 14e of the upper one are led into the recesses 12d and 14d of the lower one thereby to assure a stable coupling between the two disc holders 10.

Figure 4:
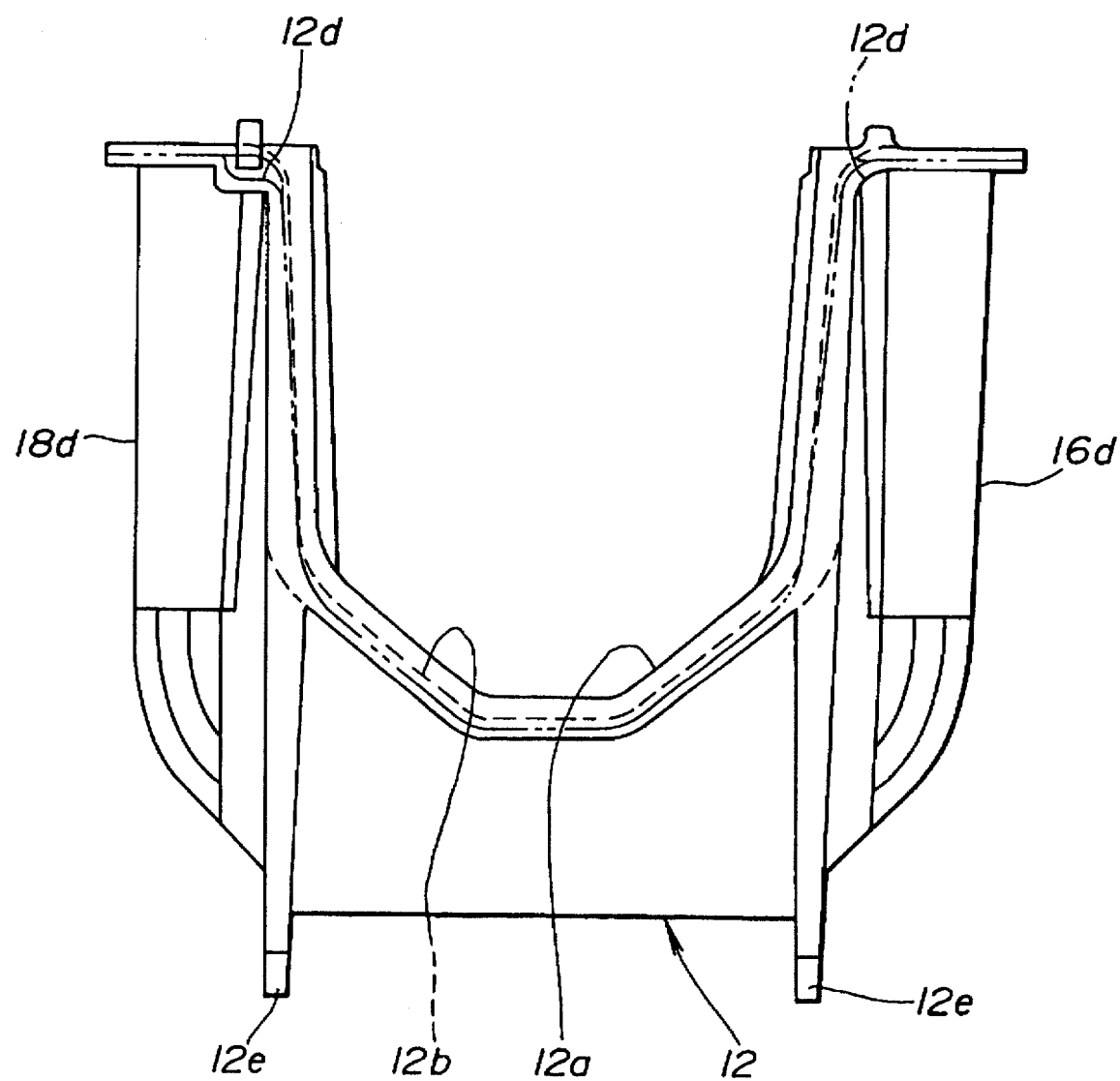
FIG. 4 is a view taken from the direction of an arrow "IV" of FIG. 1.

The shape of the end wall 12 is shown also in FIG. 4.

Referring back to FIG. 1, each side wall 16 or 18 generally comprises upper, intermediate and lower beams 16a, 16b and 16c (or 18a, 18b and 18c) which are united through side posts 16d and 16e (or 18d and 18e). The lower beam 16c or 18c is inclined relative to the lower opening. As shown, between the upper and intermediate beams 16a and 16b (or 18a and 18b) and between the intermediate and lower beams 16b and 16c (or 18b and 18c), there extend a plurality of strut portions (no numerals). Thus, each side wall 16 or 18 has a so-called grid structure which exhibits a marked stiffness irrespective of openings formed therethrough. Due to provision of the strut portions, the flow of injected plastic is smoothly and quickly made in a mold through grooves of the mold which shape the strut portions.

On an inner surface of the upper beam 16a or 18a, there are integrally formed a plurality of guide ribs 16f or 18f which are spaced from one another to define therebetween guide grooves (no numerals) into which discs 100 are to be inserted. Each guide groove is so sized as to receive one disc 100 and exposed to the outside through an elongate opening 16g or 18g formed through the upper beam 16a or 18a. As shown, each guide rib 16f or 18f has a tapered tip, so that each guide groove has a triangularly enlarged inlet portion to facilitate insertion of the disc 100 thereinto.

Preferably, the guide ribs 16f or 18f are formed as thin as possible. Experiments have revealed that the dimensional stability of the disc holder 10 increases as the guide ribs 16f or 18f are formed thinner.

Similar to the upper beam 16a or 18a, the intermediate beam 16b or 18b has at its inner surface a plurality of guide ribs 16h or 18h which are arranged in substantially the same manner as the guide ribs 16f or 18f of the upper beam 16a or 18a. Each guide rib 16h or 18h has a tapered tip. Of course, guide grooves (no numerals) defined by the guide ribs 16h or 18h are aligned respectively with those of the guide ribs 16f or 18f of the upper beam 16a or 18a.

Figure 7:
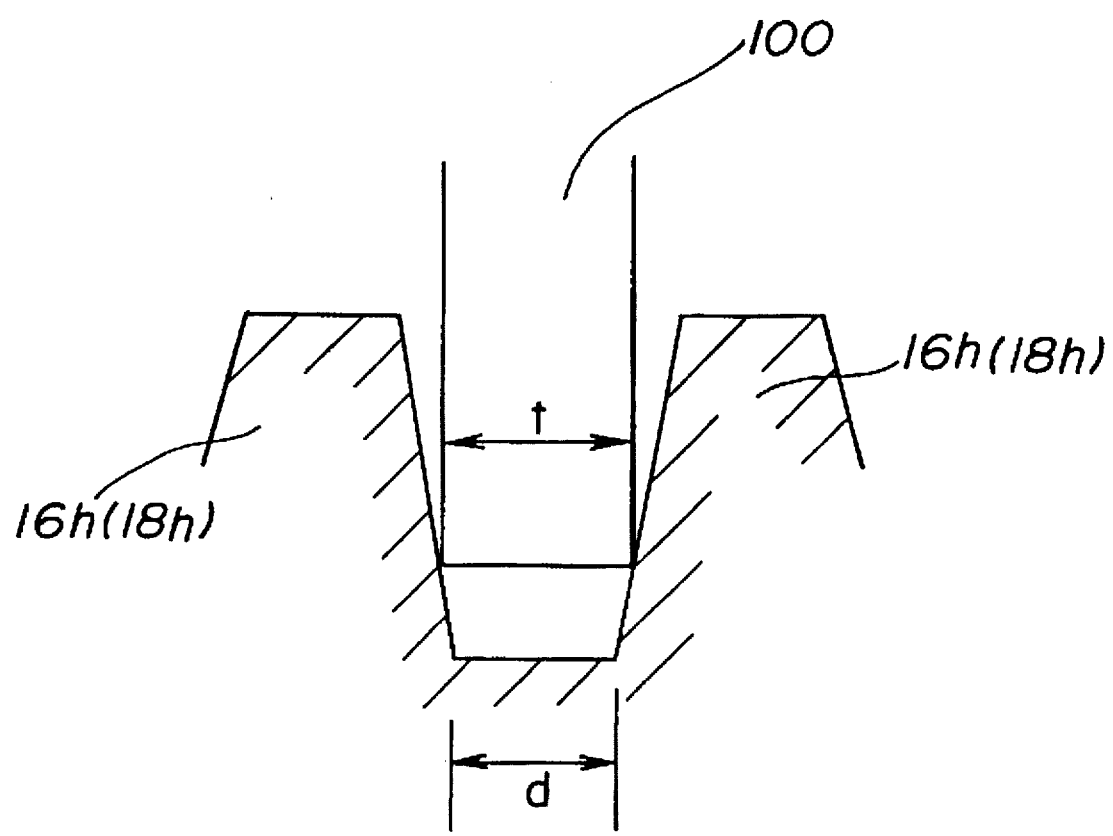
FIG. 7 is an illustration showing a disc which is by a guide groove possessed by an intermediate beam of the disc holder of the invention.

As is seen from FIG. 7, the guide ribs 16h or 18h have sloped side surfaces, so that each guide groove defined between adjacent guide ribs 16h and 16h (or 18h and 18h) has a trapezoidal cross section. That is, the width of the guide groove gradually increases with increase of distance from a bottom of the guide groove.

Figure 5:
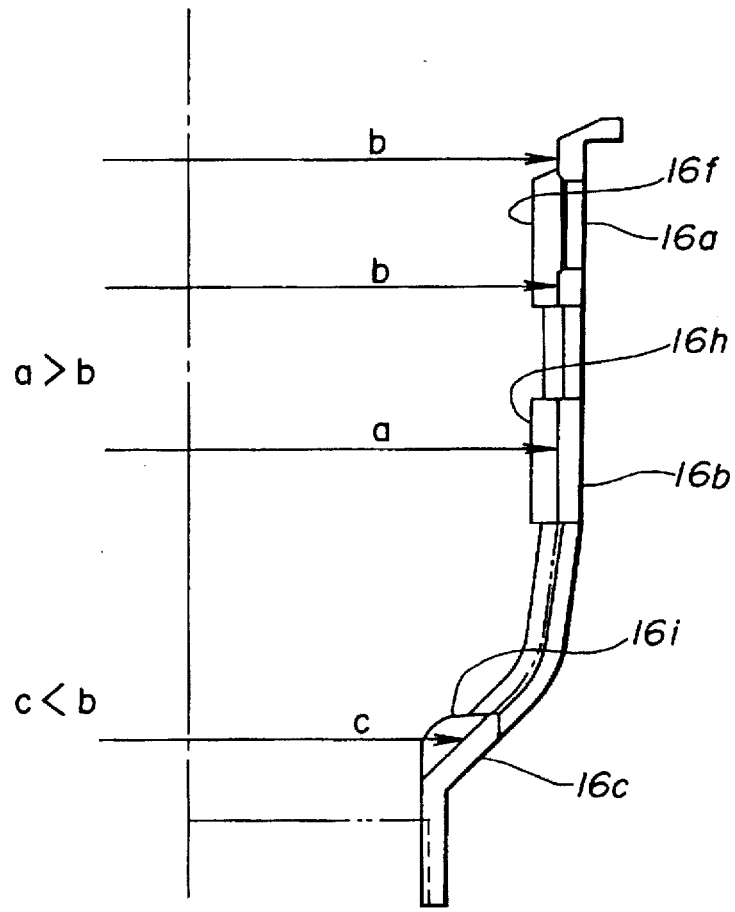
FIG. 5 is a sectional view taken along the line "V—V" of FIG. 1.

As is understood from FIG. 5, the distance "a" between paired guide grooves respectively possessed by the opposed intermediate beams 16b and 18b is somewhat greater than the distance "b" between paired guide grooves respectively possessed by the opposed upper beams 16a and 18a. This dimensional feature brings about easy insertion of the disc 100 into the right position of the disc holder 10.

Referring back to FIG. 1, also the lower beam 16c or 18c has at its inner surface a plurality of guide ribs 16i or 18i which are arranged in substantially the same manner as those of the intermediate beam 16b or 18b. Each guide rib 16i or 18i has a tapered tip. Of course, guide grooves defined by the guide ribs 16i or 18i are aligned respectively with those of the guide ribs 16h or 18h of the intermediate beam 16b or 18b. Due to the inclined arrangement of the lower beam 16c or 18c, the guide grooves of this lower beam 16c or 18c are inclined relative to the guide grooves of the upper and lower beams 16a and 16b (or 18b and 18c).

Figure 6:
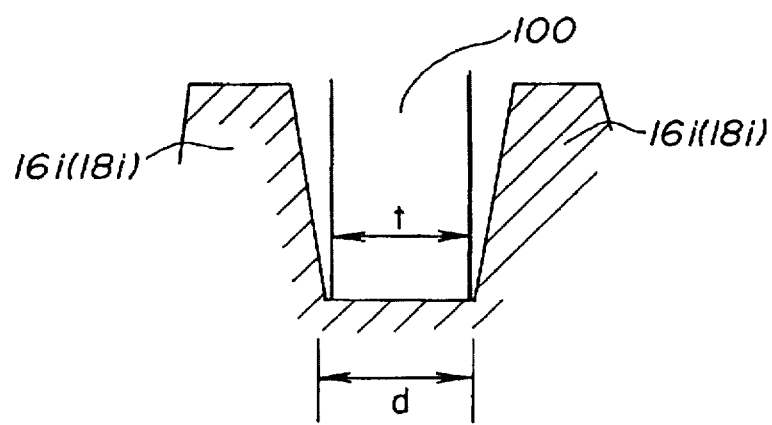
FIG. 6 is illustration showing a disc which is held by a guide groove possessed by a lower beam of the disc holder of the invention.

As is seen from FIG. 6, the guide ribs 16i or 18i have sloped side surfaces, so that each guide groove defined between adjacent guide ribs 16i and 16i (or 18i and 18i) has a trapezoidal cross section. That is, the width of the guide groove gradually increases with increase of distance from the bottom of the guide groove.

As is seen from FIG. 5, of course, the distance "c" between paired guide grooves respectively possessed by the opposed lower beams 16c and 18c is smaller than the distance "b".

As is understood from FIG. 3, when the discs 100 are properly held in the disc holder 10 of the invention, each disc 100 is supported by the intermediate beams 16b and 18b and the lower beams 16c and 18c through the respective guide grooves.

As is seen from FIGS. 6 and 7, when the discs 100 are properly held in the disc holder 10, each guide groove of the lower beam 16i or 18i fully receives the peripheral edge of the corresponding disc 100, while, each guide groove of the intermediate beam 16h or 18h partially receives the peripheral edge of the corresponding disc 100. That is, the width "d" of the bottom of each guide groove of the lower beam 16i or 18i is greater than the thickness "t" of the disc 100, while, the width "e" of the bottom of each guide groove of the intermediate beam 16h or 18h is smaller than the thickness "t" of the disc 100. Usually, the thickness "t" of a silicone wafer disc or hard disc substrate disc is about 0.6 to 1.5 mm. Thus, widths of the guide grooves are to be determined with respect to the thickness of discs 100 which are to be held.

Figure 2:
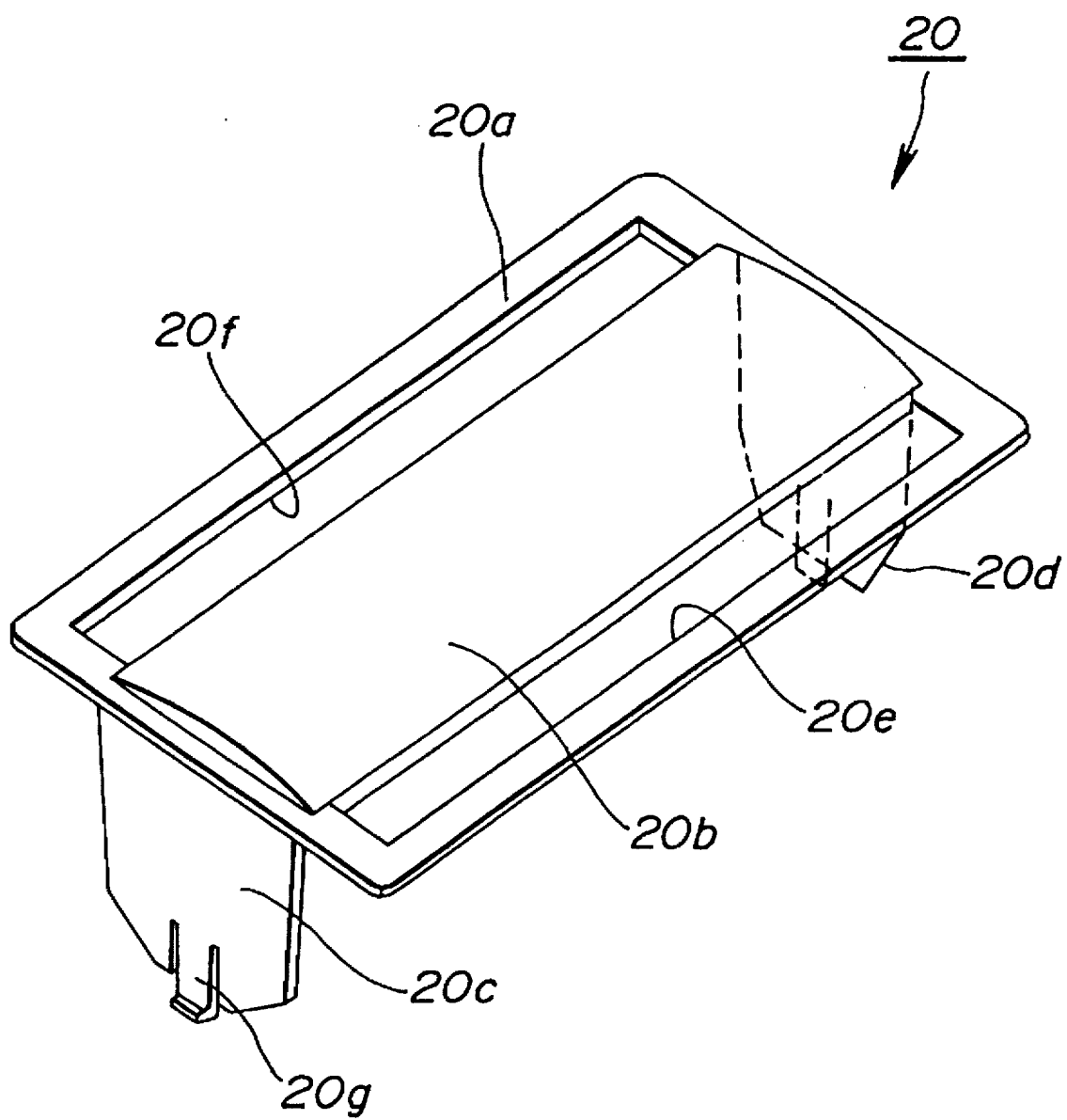
FIG. 2 is a perspective view of a lid member which can be applied to the disc holder of the invention.

Referring to FIG. 2, there is shown a lid member 20 which is to be put on the disc holder 10. The lid member 20 is constructed of a molded plastic. Injection molding technique is used for producing the lid member 20. Various plastic materials such as those mentioned hereinabove are usable for molding the lid member 20. However, if desired, the lid member 20 may be constructed of a commonly used plastic, such as polyethylene, polypropylene, polyvinyl chloride or the like.

The lid member 20 comprises generally a rectangular frame 20a, an elongate roof portion 20b and two tongue-like plates 20c and 20d. The frame 20a has a size corresponding to an upper framed part of the disc holder 10. That is, upon coupling, the frame 20a is stably put on the upper frame part of the disc holder 10.

As shown, the roof portion 20b extends between longitudinally opposed ends of the frame 20a leaving two elongate spaces 20e and 20f at lateral sides thereof. The tongue-like plates 20c and 20d extend downward from the longitudinally opposed ends of the rectangular frame 20a. Each plate 20c or 20d is so shaped and sized as to be slidably received in the groove 12b or 14b of the disc holder 10. The plate 20c or 20d is formed at a leading end thereof with a headed resilient lug 20g or 20h (not shown). That is, when the plates 20c and 20d are led into the grooves 12b and 14b of the disc holder 10 and brought to lowermost latch positions of the recesses 12a and 14a to properly put the lid member 20 on the disc holder 10, the headed resilient lugs 20g and 20h are brought into latching engagement with the drain holes 12c and 14c respectively.

Although not shown in the drawing, the roof portion 20b is integrally formed at a rear surface thereof with a plurality of ridges which are angled relative to a longitudinal axis of the roof portion 20b. Preferably, these ridges are parted into two groups which define an angle therebetween. If desired, these ridges may be constructed of a rubber material. That is, when the lid member 20 is properly put on the disc holder 10, the ridges are softly pressed on upper edges of the discs 100 held in the disc holder 10 thereby to safely hold the discs 100.

FIG. 3 shows a condition wherein one disc holder 10 of the present invention is properly put on another disc holder 10. As shown, in the illustrated example, there is defined a clearance of about 1.5 mm between the discs 100 held in the lower disc holder 10 and those in the upper lower disc holder 10.

In the following, advantages of the present invention will be described.

First, due to provision of the guide ribs by which guide grooves are defined, the disc holder 10 of the invention can safely and separately hold the discs 100.

Second, as is understood from FIG. 3, when properly held in the disc holder 10, each disc 100 is supported by four supporting points which are possessed by the two intermediate beams 16b and 18b and the two lower beams 16c and 18c. Furthermore, as is seen from FIG. 7, front and rear peripheral edges of the disc 100 are supported by four supporting points which are possessed by the two intermediate beams 16c and 18c. Thus, the discs 100 can be stably held in the disc holder 10.

Third, since the walls 12, 14, 16 and 18 of the disc holder 10 are of a perforated structure, the discs 100 can take a chemical treatment while being kept in the disc holder 10.

Fourth, when the lid member 20 is used, the discs 100 in the disc holder 10 are safely protected from foreign things. Furthermore, due to the ridges formed on the rear surface of the lid member 20, the discs 100 can be stably held in the disc holder 10.

What is claimed is:

1. A disc holder for holding a plurality of discs separately, comprising:

axially opposed end walls; and laterally opposed side walls which are united with said end walls to constitute a rectangular parallelopiped box which is fully opened at upper and lower portions, wherein each side wall includes:

spaced side posts;

an upper beam extending between upper portions of said side posts;

an intermediate beam extending between intermediate portions of said side posts;

a lower beam extending between lower portions of said side posts;

first group of strut portions which extend between the upper and intermediate beams; and second group of strut portions which extend between the intermediate and lower beams, and wherein each of said intermediate and lower beams is formed at an inner surface with a plurality of guide grooves for guiding the discs when the discs are put into the disc holder from the above.

2. A disc holder as claimed in claim 1, in which the upper beam is formed at an inner surface with a plurality of guide grooves for guiding the discs.

3. A disc holder as claimed in claim 2, in which each guide groove of said upper beams is an elongate opening through which an interior of the box is communicated with the exterior of the same.

4. A disc holder as claimed in claim 1, in which each of said opposed end walls is formed with a larger recess through which an interior of the box is communicated with an exterior of the same.

5. A disc holder as claimed in claim 1, in which each guide groove has a triangularly enlarged inlet part for facilitating insertion of a disc thereinto.

6. A disc holder as claimed in claim 1, in which each guide groove is defined between adjacent guide ribs which are formed on said inner surface.

7. A disc holder as claimed in claim 6, in which each guide rib has tapered tip.

8. A disc holder as claimed in claim 7, in which each guide rib has sloped side surfaces, so that each guide groove defined between adjacent guide ribs has a trapezoidal cross section, the width of said guide groove gradually increasing with increase of the distance from a bottom of said guide groove.

9. A disc holder as claimed in claim 3, in which the distance between paired guide grooves respectively possessed by the opposed intermediate beams is greater than the distance between paired guide grooves respectively possessed by the opposed upper beams.

10. A disc holder as claimed in claim 1, in which the width of the bottom of each guide groove possessed by the intermediate beam is smaller than the width of the bottom of each guide groove possessed by the lower beam.

11. A disc holder as claimed in claim 1, further comprising coupling assuring means which assures coupling of the disc holder with another disc holder when the former is put on the latter or vise versa, said coupling assuring means including:

means for defining at upper portions of each end wall recesses; and means for defining at lower portions of each end wall projections, wherein when the former disc holder is put on the latter disc holder, the projections of said former disc holder are led into the recesses of the latter disc holder.

12. A disc holder as claimed in claim 4, further comprising:

a lid member which is sized and constructed to cover the upper open portion of said disc holder; and connecting means for detachably connecting said lid member to said disc holder.

13. A disc holder as claimed in claim 12, in which said connecting means comprises:

a tongue-like plate extending from said lid member; and means for defining a guide groove along a peripheral portion of said larger recess of the end wall, wherein said tongue-like plate is sized and constructed to be slidably received in said guide groove.

14. A disc holder as claimed in claim 1, in which said rectangular parallelopiped box is constructed of a molded plastic.

15. A disc holder as claimed in claim 14, in which the material of said molded plastic is a PEEK/thermotropic liquid crystal polymer.

16. A disc holder as claimed in claim 12, in which said lid member is constructed of a molded plastic.

* * * * *